July 28, 1931.   C. P. STOKES ET AL   1,816,300
WHEEL
Filed March 20, 1931   3 Sheets-Sheet 1

Inventors
Cletus P. Stokes
Joseph Tamsett
By Clarence A. O'Brien
Attorney

July 28, 1931.  C. P. STOKES ET AL  1,816,300
WHEEL
Filed March 20, 1931  3 Sheets-Sheet 3

Inventors
Cletus P. Stokes
Joseph Tamsett
By Clarence A. O'Brien
Attorney.

Patented July 28, 1931

1,816,300

UNITED STATES PATENT OFFICE

CLETUS P. STOKES AND JOSEPH TAMSETT, OF MUNCIE, INDIANA

WHEEL

Application filed March 20, 1931. Serial No. 524,158.

The present invention relates generally to wheels such as are used on tractors and the like and has for its prime object to provide the wheel with a plurality of adjustable lugs which may be projected from the rim of the wheel as may be required for efficient operation of the wheel in soft ground and the like.

Another very important object of the invention resides in the provision of a lug structure which is simple, inexpensive to manufacture, easy to adjust, thoroughly efficient and reliable in use and otherwise well adapted to the purpose for which it is designed.

With the above and numerous other objects in view as will appear as the description proceeds, the invention resides in certain novel features of construction, and in the combination and arrangement of parts as may be hereinafter more fully described and claimed.

In the drawings:

Figure 5 is a sectional view taken substantially on the line 5—5 of Figure 3.

Figure 6 is an end elevation of the lug structure.

Figure 1:
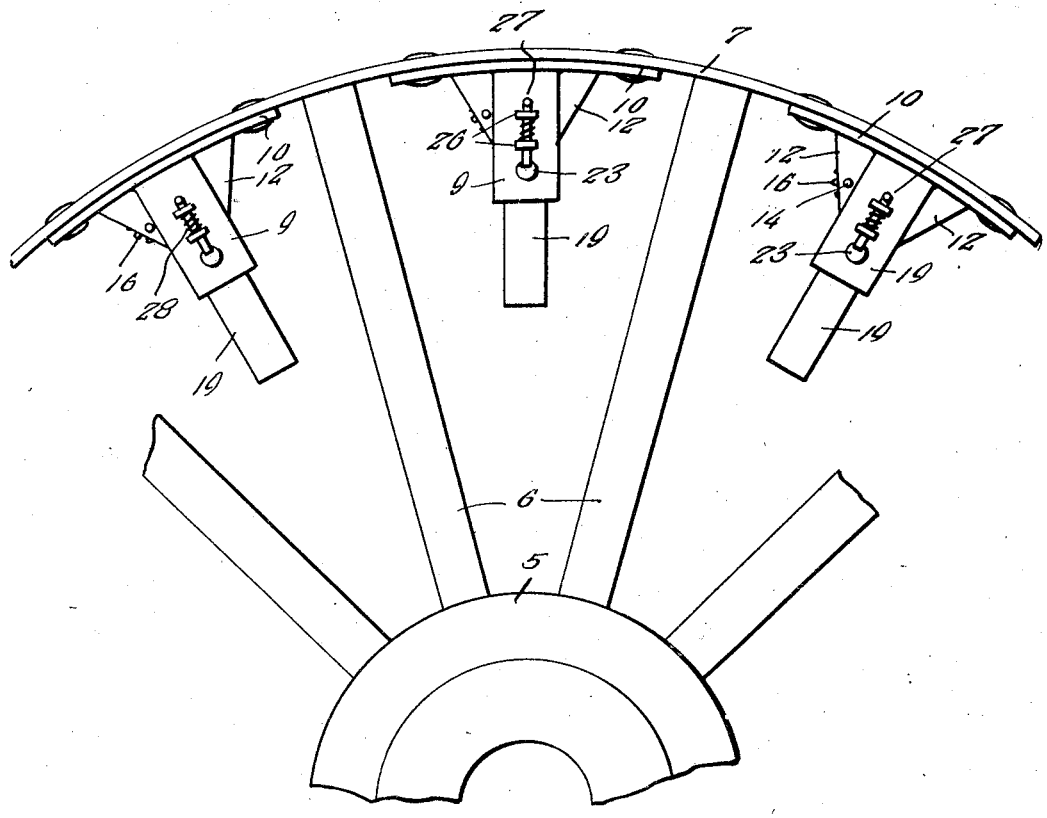
Figure 1 is a fragmentary side elevation of a wheel embodying the features of our invention.
Figure 2:
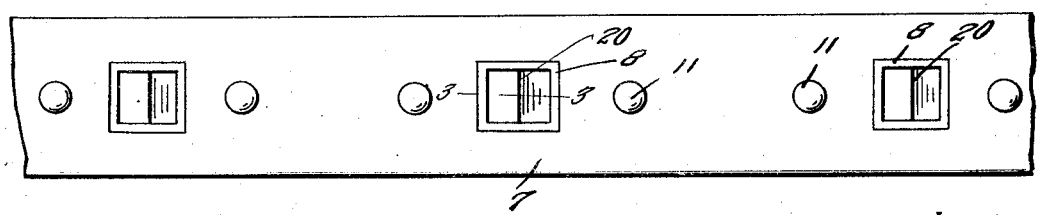
Figure 2 is a fragmentary plan view showing a portion of the rim and several lugs associated therewith.

Referring to the drawings in detail it will be seen that the wheel illustrated herein for the purpose of exemplifying my lug structures includes a hub 5 with spokes 6 radiating therefrom and attached to a rim 7. This rim 7 is formed with a plurality of openings 8 for the lug structures about to be described. Since these lug structures are identical in construction only one will be described in detail for the purpose of simplicity.

Each lug structure comprises a non-circular sleeve 9, a portion of which projects into the opening 8 to terminate flush with the outer surface of the rim 7 and the remaining portion of the sleeve radiates inwardly. The sleeve is formed with a flange 10 riveted or otherwise secured as at 11 to the rim 7. A number of web braces 12 is provided between the flange and the sleeve. A shaft 14 is journalled between one pair of the webs 12 and terminates in a squared end 15.

Figure 3:
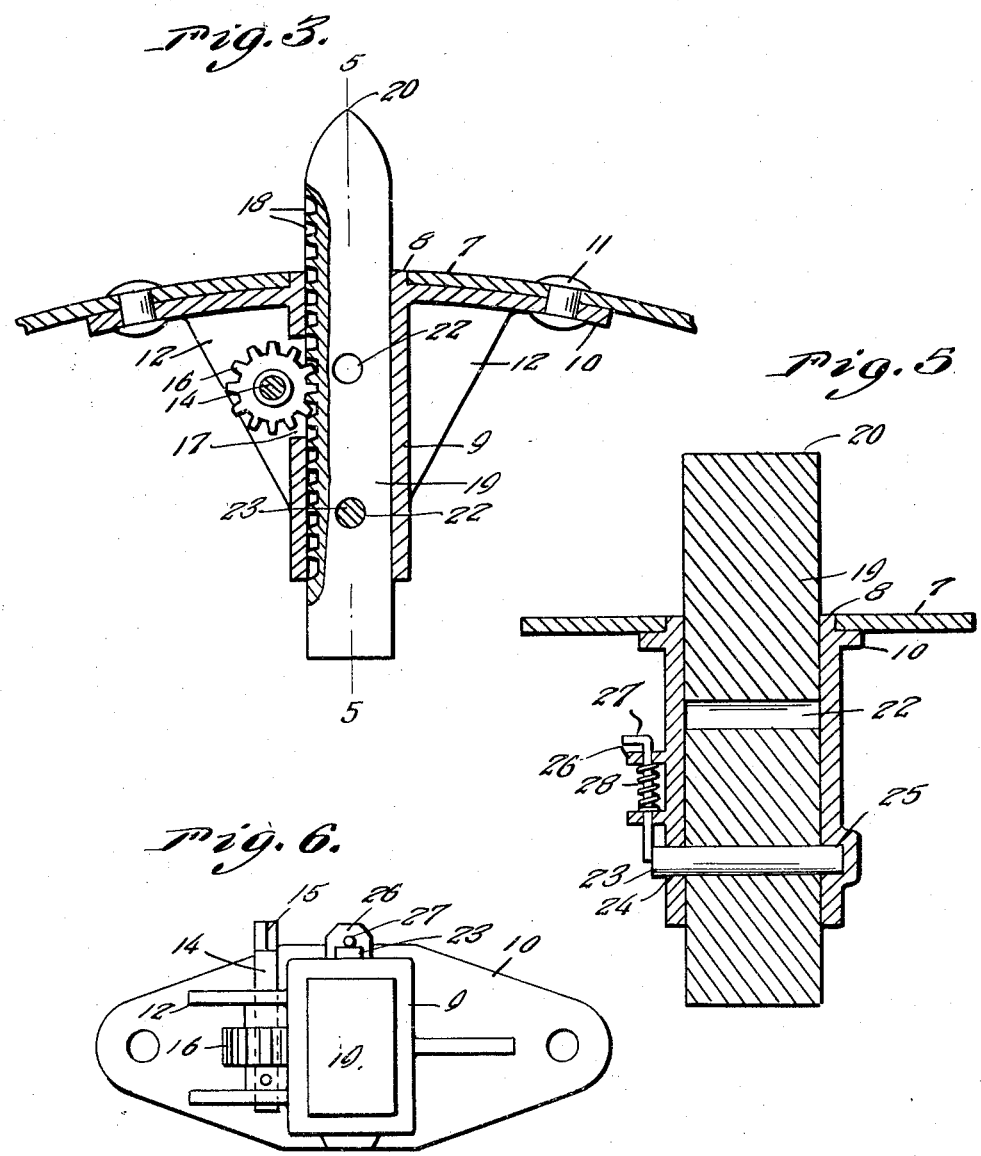
Figure 3 is a sectional view taken substantially on the line 3—3 of Figure 2 showing a lug projected.
Figure 4:
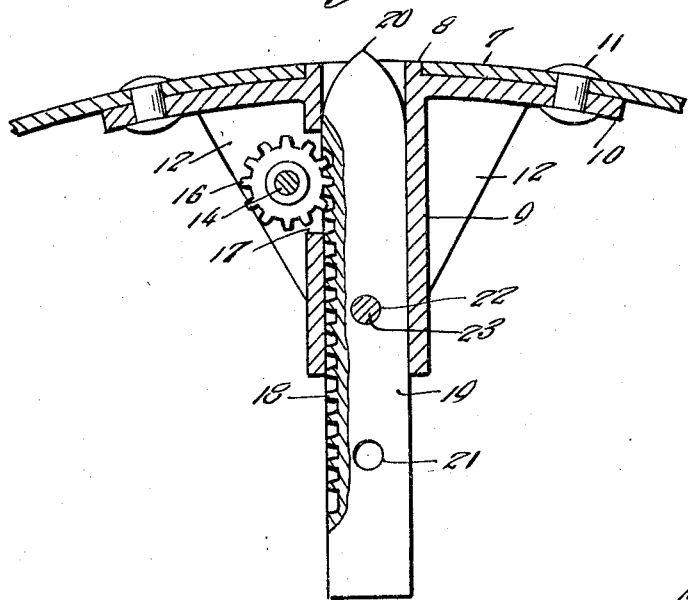
Figure 4 is a similar view showing a lug retracted.
Figure 8:
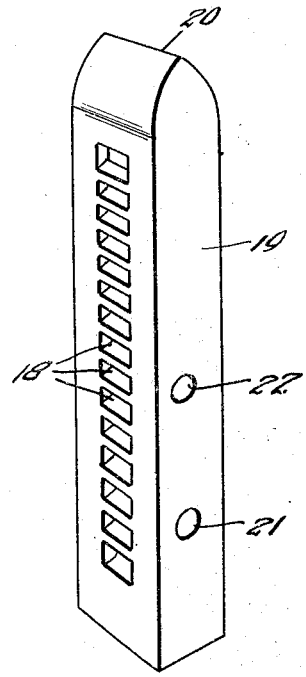
Figure 8 is a perspective view of one of the lugs.
Figure 7:
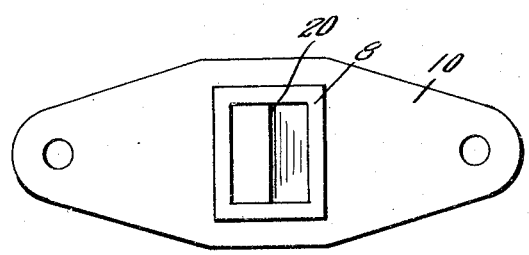
Figure 7 is another end elevation thereof taken opposite to that shown in Figure 6.

A rack gear 16 is mounted on the shaft 14 between a pair of the webs 12 so that a portion thereof projects through a slot 17 in the sleeve so as to mesh with a longitudinal series of rack teeth 18 on one side of a lug 19 slidable in the sleeve. The outer end of this lug is pointed as at 20. The lug is provided with a pair of openings 21 and 22 so that a pin 23 may be projected therethrough and through a corresponding opening 24 and into a recess 25 in opposite sides of the sleeve. On the side of the sleeve having the opening 24 there is a pair of spaced apertured lugs 26 to slidably receive a lock pin 27 urged inwardly by a spring 28 over the end of the pin 23 for holding the same against accidental displacement after the lug has been adjusted to an outwardly extending position as shown in Figure 3 or to the retracted position shown in Figure 4.

After the pin has been removed, of course, the lug is easily adjusted by turning the shaft 14 by a suitable crank handle or the like which may be fitted over the squared end 15.

It is thought that the construction, operation, utility and advantages of this invention will now be quite apparent to those skilled in this art without a more detailed description thereof.

The present embodiment of the invention has been described in considerable detail merely for the purposes of exemplification since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described our invention, what we claim as new is:

In combination with a wheel including a rim having a plurality of openings therein, a plurality of lug structures associated with the rim, one adjacent each opening therein, each lug structure comprising a sleeve fitted in the rim to radiate inwardly therefrom in alinement with one of the openings, a lug slidable through the sleeve, and means for extending the lug outwardly of the sleeve or retracting the same inwardly of the sleeve, a pin projectable through openings in the lug and openings in the sleeve to hold the lug either in an extended or retracted position, said means for adjusting the lug comprising rack teeth on the lug, webs extending from the sleeve, a shaft journalled through the webs, and a rack gear on the shaft extending through a slot in the sleeve in mesh with the rack teeth.

In testimony whereof we affix our signatures.

CLETUS P. STOKES.
JOSEPH TAMSETT.